United States Patent Office 3,804,911
Patented Apr. 16, 1974

3,804,911
METHOD OF DECONTAMINATING HYDROCARBONS USED AS SOLVENTS AND MONOMERS IN PRODUCTION OF SYNTHETIC RUBBER
Alexandr Grigorievich Liakumovich, prospekt Lenina 23, kv. 4; Alexei Dmitrievich Linkov, ulitsa Revoljutsionnaya 7, kv. 8; Grigory Iosifovich Rutman, ulitsa Revoljutsionnaya 7, kv. 6; and Jury Ivanovich Michurov, ulitsa Khudaiberdina 125, kv. 36, all of Sterlitamak U.S.S.R.; Izrail Markovich Belgorodsky, ulitsa Karla Marxa 50, kv. 28; and Efim Moiseevich Sire, ulitsa Karla Marxa 64, kv. 27, both of Tolyatti, U.S.S.R.; and Boris Izrailevich Pantukh, prospekt Oktyabrya 6, kv. 97, Sterlitamak, U.S.S.R.
No Drawing. Filed July 9, 1971, Ser. No. 161,913
Int. Cl. C07c 7/02
U.S. Cl. 260—666 A                9 Claims

ABSTRACT OF THE DISCLOSURE

A method of decontaminating hydrocarbons used as solvents and monomers in the production of synthetic rubber by stereospecific polymerization from cyclopentadiene consisting in treating a mixture of said hydrocarbons and cyclopentadiene with cyclic ketones in the presence of a catalyst which is an alkali metal hydroxide or an anion-exchange resin in the [OH−] form to obtain a fulvene, whereafter the hydrocarbons are distilled off from the mixture thus produced.

The method is simple and permits inexpensive catalysts to be used. The method is effective since it eliminates losses of catalysts and cyclic ketones.

---

The present invention relates to methods of decontaminating hydrocarbons used as solvents and monomers in the production of synthetic rubber by stereospecific polymerization from cyclopentadiene.

Cyclopentadiene is a strong contaminant in stereospecific polymerization so that the quality of a synthetic rubber being produced materially depends on the degree of decontamination of said hydrocarbons.

A method of decontaminating hydrocarbons used as solvents and monomers in the production of synthetic rubber by stereospecific polymerization from cyclopentadiene is known. This method consists in binding cyclopentadiene by carbonyl compounds such as benzaldehyde, salicylaldehyde, acetophenone, cyclopentanone in the presence of alkali metal alcoholates with the formation of the respective fulvenes. A decontaminated hydrocarbon is further treated with sodium bisulfite and water to remove said carbonyl compounds and the fulvenes are distilled off.

The disadvantage of this prior art method is that the alkali metal alcoholate used therein as a catalyst is expensive and requires thorough dessication of the decontaminated hydrocarbon, the consumption of the catalyst being important since it is decomposed by water released during the binding of cyclopentadiene. Furthermore, the carbonyl compounds used are capable of being polymerized under the conditions of hydrocarbons decontamination resulting in clogging of equipment and excluding the possibility of stable operational conditions.

This method is rather complicated since for final decontamination bisulfite and water treatment of the hydrocarbon being decontaminated is required.

It is an object of the present invention to provide a method of decontaminating hydrocarbons used as solvents and monomers in the production of synthetic rubber by stereospecific polymerization which would permit the use of less expensive catalyst eliminating losses thereof.

It is another object of the present invention to provide a method of decontaminating said hydrocarbons which would eliminate losses of carbonyl compounds.

It is a further object of the present invention to provide a more simple method of decontaminating said hydrocarbons.

According to these and other objects the method of the invention consists in decontaminating of said hydrocarbons from cyclopentadiene, the content of which in said hydrocarbons is 0.001–0.05% by weight thereof, by treating a mixture of said hydrocarbons and cyclopentadiene with a carbonyl compound in the presence of a basic catalyst, obtaining a fulvene with further distillation of said hydrocarbons from the mixture thus produced. According to the invention the carbonyl compounds used are cyclic ketones having from 6 to 12 carbon atoms in a 10–2000 times stoichiometric excess with respect to cyclopentadiene, the catalyst comprising alkali metal hydroxides or anion exchange resins in the (OH−) form.

In the method of decontaminating hydrocarbons according to the invention an inexpensive catalyst is used, the catalyst losses being eliminated. At the same time, the use of cyclic ketones free of a mobile hydrogen in α-position in relation to a carbonyl group as carbonyl compounds makes it possible to prevent these compounds from being polymerized. In addition, the method dispenses with the treatment of a decontaminated hydrocarbon with sodium bisulfite and water.

By the method according to the invention it is possible to decontaminate hydrocarbons containing up to 0.5% cyclopentadiene by weight of said hydrocarbons. In this case the content of cyclopentadiene, if any, in the decontaminated hydrocarbons does not exceed 0.0001% by weight. This method is suitable both for individual hydrocarbons and mixtures thereof.

Decontamination of hydrocarbons may be performed using alkali metal hydroxides in the form of solutions in aliphatic or cyclic alcohols having from 4 to 12 carbon atoms, the amount of alkali metal hydroxides being 0.5–5% by weight of the hydrocarbons to be decontaminated.

In order to eliminate contamination of hydrocarbons being decontaminated with a solvent, it is advantageous to use solid alkali metal hydroxides, the amount of alkali metal hydroxides being such that the flow rate of hydrocarbons being decontaminated will be 0.1–2 hour−1.

It is advantageous to perform decontamination with an anion-exchange resin using an amount of this resin such that the flow rate of hydrocarbons being decontaminated will be of 0.1–4 hour−1.

In order to eliminate losses of hydrocarbons being decontaminated, where polymerization thereof is possible and to utilize the unreacted cyclic ketone, it is advantageous to treat a mixture of said hydrocarbons and cyclopentadiene with cyclic ketones in the presence of 5–60% of a fulvene by weight of hydrocarbons being decontaminated, said fulvene being recovered together with unreacted cyclic ketone after distilling off the decontaminated hydrocarbons and are recycled back to said stage of treatment of the initial mixture with cyclic ketones.

In order to increase the rate and degree of decontamination of said hydrocarbons it is advantageous to treat a mixture of said hydrocarbons and cyclopentadiene with cyclic ketones at 40–100° C.

An increase in the rate of decontamination of said hydrocarbons may also be achieved by performing said treatment in the presence of phenol, an alkylsubstituted phenol or a polyvalent phenol in an amount of 0.1–1% by weight of the hydrocarbons being decontaminated.

The method of decontaminating said hydrocarbons according to the invention using alkali metal hydroxides in the solid phase or anion-exchange resins in the [OH⁻] form is performed in the following way:

A hydrocarbon or a mixture of hydrocarbons to be decontaminated and containing 0.001–0.5% cyclopentadiene by weight are mixed with a cyclic ketone in a 10–2000 times stoichiometric excess with respect to cyclopentadiene. The mixture, which is thus formed, is fed into a reactor filled with granules of a solid alkali metal hydroxide or with granules of an anion-exchange resin. Furthermore, said mixture may be heated up to no more than 100° C. before entering the reactor.

Said mixture is passed through the reactor and is fed into a distillation column wherein the decontaminated hydrocarbon or mixture of hydrocarbons is distilled off. In order to prevent hydrocarbons being decontaminated from being polymerized and to utilize unreacted cyclic ketone, the distillation residue of the distillation column, which contains a fulvene obtained by reaction between cyclopentadiene and a cyclic ketone and unreacted ketone, are mixed with fresh hydrocarbons being charged for decontamination. In this case (in stabilized operational conditions) a mixture entering the reactor has the following composition in percent by weight: a hydrocarbon or a mixture of hydrocarbons to be decontaminated, 60–80; a fulvene, 10–50; a cyclic ketone, 3–10. The distillation residue of the distillation column accordingly contains 5–15% cyclic ketone and 30–60% fulvene by weight.

As mentioned above, the content of cyclopentadiene, if any, in the decontaminated hydrocarbons, does not exceed 0.0001% by weight.

In the case, where an alcoholic solution of an alkali metal hydroxide is used as the basic catalyst, the method of decontaminating said hydrocarbons is performed in the following way:

A hydrocarbon or a mixture of hydrocarbons containing 0.001–0.5% by weight of cyclopentadiene is mixed with a cyclic ketone and an alkali metal hydroxide dissolved in an alcohol. The mixture, which is thus produced, is fed into a hollow reactor without preliminary heating or after heating up to no more than 100° C.

Said mixture is passed through the reactor and is directed into a distillation column wherein a decontaminated hydrocarbon or a mixture of hydrocarbons is distilled off. For the above-mentioned reasons, the distillation residue of the distillation column which contains a fulvene, unreacted ketone, a solvent and an alkali metal hydroxide is advantageously mixed with hydrocarbons being charged for decontamination. In this case (in stabilized operational conditions) the mixture obtained in the reactor will have the following composition in percent by weight: a hydrocarbon or a mixture of hydrocarbons to be decontaminated, 60–70; a fulvene, 10–50; a cyclic ketone, 4–8; an alkali metal hydroxide, 0.5–2; an aliphatic or cyclic alcohol, 3–10. At the same time, the distillation residue in the distillation column contains in percent by weight: a cyclic ketone, 8–10; a fulvene, 30–50; an alkali metal hydroxide, 1–3; an alcohol, 10–15.

The degree of decontamination of hydrocarbons from cyclopentadiene is similar to that mentioned above.

For a better understanding of the present invention examples of the decontamination of hydrocarbons used as solvents and monomers in the production of synthetic rubber from cyclopentadiene are given hereinbelow.

EXAMPLE 1

100 g. isoprene containing 0.004% by weight cyclopentadiene were mixed with 8 g. cyclohexanone. The mixture thus produced was passed through a column filled with solid potassium hydroxide at 25° C. The flow rate of isoprene was 0.16 hour⁻¹. Then isoprene was distilled off from the mixture thus obtained which contained isoprene, a fulvene and unreacted cyclohexanone. The content of cyclopentadiene in the decontaminated isoprene was 0.0001% by weight.

EXAMPLE 2

500 g. piperylene containing 0.014 by weight cyclopentadiene were mixed with 25 g. cyclooctanone and 0.1 g. 2,6-ditertiarybutylphenol. The mixture thus produced was passed at 20° C. through a column filled with an anion-exchange resin obtained by a successive treatment of a copolymer of divinylbenzene and styrene with methyl chloride, trimethylamine and a water solution of potassium hydroxide. The flow rate of piperylene was 0.5 hour⁻¹.

Piperylene was distilled off from the mixture thus obtained, whereafter the content of cyclopentadiene in piperylene was 0.00008% by weight.

EXAMPLE 3

An initial mixture which consisted of 100 g. isopentane, 20 g. cyclododecanone and 1 g. pyrocatechol was passed through a column filled with solid potassium hydroxide in conditions similar to Example 1.

From the mixture thus produced isopentane was distilled off. The initial content of cyclopentadiene in the isopentane was 0.004% by weight, the final content was a trace. Carbonyl compounds were not found in the decontaminated isopentane.

EXAMPLE 4

An initial mixture was produced by mixing isoprene to be decontaminated (the initial content of cyclopentadiene in the isoprene was 0.005% by weight) and the distillation residue of a column in which decontaminated isoprene was distilled off. The mixture had the following composition in percent by weight: isoprene, 60; a fulvene, 35; cyclohexanone, 5. Said mixture was heated up to 60° C. and passed at the flow rate of 1 hour⁻¹ through a column filled with granules of solid potassium hydroxide. Then the mixture was fed into a ten-plate distillation column wherein isoprene was distilled off at the reflux ratio of 0.5, temperature at the top of the column 35° C. and at the bottom of the column 85° C. After distillation a distillate—decontaminated isoprene—was obtained in which there was no cyclopentadiene nor carbonyl products, and a distillation residue which had the following composition in percent by weight: isoprene, 20; a fulvene, 70; cyclohexanone, 10. The distillation residue was re-mixed with fresh isoprene being charged for decontamination. In decontaminating isoprene according to the above-described pattern the content of cyclohexanone in the reaction mixture reduced within 7 days from 5% to 4.6% by weight. Polymerization products of isoprene were not found in the distillation residue of the column during this period.

EXAMPLE 5

A mixture which consisted of 100 piperylene, 0.6 g. cyclopentadiene, 0.5 g. potassium hydroxide, 10 g. isoamyl alcohol and 10 g. cycloheptanone was thermally stabilized at 50° C. for 2 hours. Then piperylene was distilled off from the mixture and analyzed for cyclopentadiene, the latter having been not found in piperylene.

EXAMPLE 6

A mixture which consisted of 80 g. isoprene, 20 g. isopentane, 0.1 g. cyclopentadiene, 0.5 g. lithium hydroxide, 10 g. cyclohexanol, 12 g. cyclohexanone and 0.1 phenol was thermally stabilized at 60° C. for 1 hour. Then hydrocarbons—isoprene and isopentane—were distilled off from the mixture, and cyclopentadiene was not found therein.

EXAMPLE 7

Cyclopentene containing 0.2% by weight cyclopentadiene was mixed with the distillation residue of a column for distilling off decontaminated cyclopentene. The mixture thus produced had the following composition in percent by weight: cyclopentene, 75; a fulvene, 15; cyclooctanone, 10. The mixture was passed through a reactor filled with a resin having the functional groups R₄NOH obtained by successive treatment of a copolymer of divinyl and paramethylstyrene with methyl chloride, pyridine and an alcohol solution of sodium hydroxide. The flow rate of cyclopentene was 4 hour⁻¹, the temperature in the reactor 85° C. After having passed through the reactor the mixture was fed into a 15-plate distillation column wherein cyclopentene was distilled off. The distillation residue (in percent by weight: cyclopentene, 50; a fulvene, 20; cyclooctanone, 30) was mixed with fresh cyclopentene being charged for decontamination.

Cyclopentadiene was not found in the decontaminated cyclopentene.

EXAMPLE 8

100 g. of n-pentane which contained 0.1% by weight cyclopentadiene was mixed with 20 g. cyclooctanone, whereafter 10 g. of n-hexyl alcohol and 1.3 g. potassium hydroxide were added to the mixture. The mixture thus produced was heated at 100° C. for 15 minutes. Then the mixture was cooled to 40° C. and n-pentane was distilled off. Decontaminated n-pentane contained 0.00005% by weight cyclopentadiene.

What is claimed is:

1. A method of decontaminating hydrocarbons used as solvents and monomers in the production of synthetic rubber by stereospecific polymerization from cyclopentadiene present in the amount of 0.001–0.5% by weight of said hydrocarbons, comprising treating a mixture of said hydrocarbons and cyclopentadiene with acyclic ketone having from 6 to 12 carbon atoms at a 10–2000 times stoichiometric excess of said ketone with respect to cyclopentadiene in the presence of a catalyst selected from the group consisting of alkali metal hydroxide an anion-exchange resins in the (OH⁻) form thus obtaining a fulvene, said treatment taking place in the presence of 50–60% of a fulvene by weight of the hydrocarbons being decontaminated, said fulvene having been recycled together with unreacted ketone from a previous distillation of decontaminated hydrocarbons; and distilling off the decontaminated hydrocarbons containing not more than 0.0001% by weight of cyclopentadiene.

2. A method according to claim 1, wherein the alkali metal hydroxide is used in the form of a solution in an aliphatic alcohol having from 4 to 12 carbon atoms, the amount of alkali metal hydroxide being 0.5–5% by weight of the hydrocarbons being decontaminated.

3. A method according to claim 1, wherein the alkali metal hydroxide is used in the form of a solution in a cyclic alcohol having from 4 to 12 carbon atoms, the amount of alkali metal hydroxide being 0.5–5% by weight of the hydrocarbons being decontaminated.

4. A method according to claim 1, wherein the catalyst is a solid alkali metal hydroxide in an amount such that the flow rate of hydrocarbons being decontaminated will be 0.1–2 hour⁻¹.

5. A method according to claim 1, wherein the catalyst is an anion-exchange resin in an amount such that the flow rate of hydrocarbons being decontaminated will be 0.1–4 hour⁻¹.

6. A method according to claim 1, wherein the mixture of hydrocarbons and cyclopentadiene is treated with a cyclic ketone at 40–100° C.

7. A method according to claim 1, wherein the mixture of hydrocarbons and cyclopentadiene is treated with a cyclic ketone in the presence of phenol in an amount of 0.01–1% by weight of the hydrocarbons being decontaminated.

8. A method according to claim 1, wherein the mixture of hydrocarbons with cyclopentadiene is treated with a cyclic ketone in the presence of an alkyl-substituted phenol in an amount of 0.01–1% by weight of the hydrocarbons being decontaminated.

9. A method according to claim 1, wherein the mixture of hydrocarbons and cyclopentadiene is treated with a cyclic ketone in the presence of a polyvalent phenol in an amount of 0.1–1% by weight of the hydrocarbons being decontaminated.

References Cited
UNITED STATES PATENTS

| | | | |
|---|---|---|---|
| 2,982,796 | 5/1961 | Veal | 260—681.5 |
| 2,589,969 | 3/1952 | Schutze et al. | 260—666 |
| 3,051,765 | 8/1962 | McCain | 260—666 |

DELBERT E. GANTZ, Primary Examiner

C. E. SPRESSER, JR., Assistant Examiner

U.S. Cl. X.R.

260—676 R; 681.5 R